United States Patent [19]

Glück et al.

[11] Patent Number: 6,046,245
[45] Date of Patent: Apr. 4, 2000

[54] PRODUCTION OF EXPANDABLE STYRENE POLYMERS

[75] Inventors: Guiscard Glück, Mainz; Karl-Heinz Batscheider, Mutterstadt, both of Germany

[73] Assignee: BASF Aktiengesellschaft, Ludwigshaften, Germany

[21] Appl. No.: 09/368,412

[22] Filed: Aug. 5, 1999

[30] Foreign Application Priority Data

Aug. 6, 1998 [DE] Germany ............... 198 35 495

[51] Int. Cl.$^7$ ................... C08J 9/18; C08J 9/20
[52] U.S. Cl. ................ 521/56; 521/96; 521/146
[58] Field of Search .............. 521/56, 96, 146

[56] References Cited

U.S. PATENT DOCUMENTS

| 5,177,115 | 1/1993 | Hintz et al. | 521/56 |
| 5,266,602 | 11/1993 | Walter et al. | 521/56 |
| 5,266,603 | 11/1993 | Holzmeier | 521/56 |
| 5,908,872 | 6/1999 | Gluck et al. | 521/56 |

FOREIGN PATENT DOCUMENTS 0 488 040  6/1992  European Pat. Off. .

*Primary Examiner*—Morton Foelak
*Attorney, Agent, or Firm*—Oblon, Spivak, McClelland, Maier & Neustadt, P.C.

[57] ABSTRACT

In a process for producing preferably graphite-containing, expandable styrene polymers by polymerization of styrene in aqueous suspension in the presence of two peroxides which decompose at different temperatures, the peroxide which decomposes at the higher temperature is di-tert-amyl peroxide.

3 Claims, No Drawings

PRODUCTION OF EXPANDABLE STYRENE POLYMERS

The present invention relates to an improved process for producing expandable styrene polymers (EPS).

The suspension polymerization of styrene for producing EPS is usually carried out as a batchwise process using a rising temperature profile. As polymerization initiators, use is made of peroxides having different half-life periods. According to EP-A 488 040, dibenzoyl peroxide is used during the first stage of the polymerization at from about 80 to 90° C. and a peroxide having a higher decomposition temperature, e.g. dicumyl peroxide, is used during the second stage of the polymerization at from about 105 to 130° C. This procedure makes it possible to achieve a benzene-free EPS having low residual monomer contents. The use of peroxides having different half-life periods as a function of the temperature allows controlled removal of the heat of reaction over the total process. This is particularly important for large reaction vessels as are employed in industrial production which have an unfavorable volume/surface area ratio for removal of heat.

It has been found that when this procedure is used, the resulting EPS particles have a comparatively high internal water content which, on prolonged storage, can lead to sweating of the water and thus to conglutination during processing and, on prefoaming, gives foam particles having an irregular cell structure. Furthermore, the residual monomer content is still too high in many cases. These phenomena are particularly pronounced when the polymerization is carried out, as described in patent application PCT/EP 97/02457, in the presence of from 0.05 to 25% by weight of graphite particles, which makes it possible to produce foams having a reduced thermal conductivity.

It is an object of the present invention to reduce the internal water content and the residual monomer content in the production of EPS.

We have found that this object is achieved by using di-tert-amyl peroxide of the formula

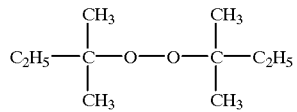

as peroxide B which decomposes at a higher temperature.

Di-tert-amyl peroxide is known per se, it is marketed by AKZO NOBEL under the name Trigonox 201 and is recommended, inter alia, for the polymerization of ethylene, styrene and (meth)acrylates. However, it was not possible to foresee that the use of this peroxide in the production of expandable styrene polymers, particularly in the suspension polymerization in the presence of graphite, would give EPS particles having a reduced internal water content and residual monomer content.

The present invention accordingly provides a process for producing expandable styrene polymers in which styrene, if desired together with up to 20% of its weight of comonomers, is polymerized in aqueous suspension in the presence of at least two organic peroxides A and B which decompose at different temperatures, where the peroxide A has a half-life period of 1 hour at from 80° C. to 100° C. and the peroxide B has a half-life period of 1 hour at from 110° C. to 150° C., wherein the peroxide B which decomposes at the higher temperature is di-tert-amyl peroxide.

In the suspension polymerization according to the present invention, preference is given to using styrene alone as monomer. However, it can be replaced to an extent of up to 20% of its weight by other ethylenically unsaturated monomers such as alkylstyrenes, divinylbenzene, acrylonitrile, 1,1-diphenylethene or α-methylstyrene.

The customary auxiliaries, e.g. suspension stabilizers, blowing agents, chain transferrers, expansion aids, nucleating agents and plasticizers can be added in the suspension polymerization. Particular preference is given to adding flame retardants, preferably in amounts of from 0.6 to 6% by weight, and flame retardant synergists in amounts of from 0.1 to 1% by weight, in each case based on the resulting styrene polymer. Preferred flame retardants are aliphatic, cycloaliphatic and aromatic bromine compounds such as hexabromocyclododecane, pentabromomonochlorocyclohexane and pentabromophenyl allyl ether. Suitable synergists are C—C- or O—O-labile organic compounds such as bicumyl and dicumyl peroxide. Blowing agents are added in amounts of from 3 to 10% by weight, based on the monomer. They can be added to the suspension before, during or after the polymerization. Suitable blowing agents are aliphatic hydrocarbons having from 4 to 6 carbon atoms. It is advantageous to use inorganic Pickering dispersants, e.g. magnesium pyrophosphate or calcium phosphate, as suspension stabilizers.

Particular preference is given to carrying out the polymerization, as described in PCT/EP 97/02457, in the presence of from 0.05 to 25% by weight, preferably from 1 to 8% by weight, of graphite particles having a mean particle size of preferably from 1 to 50 μm.

According to the present invention, the suspension polymerization is carried out in the presence of at least two peroxides which decompose at different temperatures. The peroxide A which decomposes at the lower temperature should have a half-life period of 1 hour at from 80° C. to 100° C., preferably from 85° C. to 95° C.; the peroxide B which decomposes at the higher temperature is di-tert-amyl peroxide having a half-life period of 1 hour at 128° C.

The suspension polymerization is advantageously, as described in EP-A 405 324, carried out in two temperature stages. Here, the suspension is first heated to from 80° C. to 90° C. over a period of about 2 hours. During this stage, the peroxide A decomposes and initiates the polymerization. The reaction temperature is then allowed to rise, preferably by from 8 to 17° C. per hour, to from 100 to 130° C. and is held at this temperature until the residual monomer content has dropped to less than 1000 ppm. At this temperature, the peroxide B decomposes. This procedure makes it possible to produce EPS having low residual monomer contents, preferably of less than 500 ppm, or to achieve a significant reduction in the polymerization time required for the residual styrene content to fall to below 1000 ppm.

The peroxide A can be, for example, dibenzoyl peroxide, but preference is given to peroxides which do not form any benzoyl and benzyl radicals on decomposition, e.g. tert-butyl peroxy-2-ethylhexanoate, tert-amyl peroxy-2-ethylhexanoate, tert-butyl peroxydiethylacetate and tert-butyl peroxyisobutanoate. The peroxide A is preferably used in amounts of from 0.01 to 0.2 mol %, in particular from 0.03 to 0.15 mol %, based on 1 mol of monomer.

The peroxide B is preferably used in amounts of from 0.10 to 1.0 mol %, in particular from 0.16 to 0.50 mol %, based on the monomer. The molar ratio of the peroxides B:A should preferably be greater than 40:60, particularly preferably greater than 50:50.

The suspension polymerization forms bead-shaped, essentially round particles having a mean diameter in the range from 0.2 to 2 mm. They may be coated with the customary coating materials, e.g. metal stearates, glyceryl esters and finely divided silicates.

The EPS particles can be processed to produce polystyrene foams having densities of from 5 to 100 g/l, preferably from 10 to 50 g/l. For this purpose, the expandable particles are prefoamed. This is usually achieved by heating the particles with steam in prefoamers. The particles which have been prefoamed in this way are then welded together to produce moldings. For this purpose, the prefoamed particles are introduced into molds which do not close in a gastight manner and are treated with steam. After cooling, the moldings can be removed from the mold.

EXAMPLES a) Example using dicumyl peroxide (comparison)

600 g of graphite powder (from Kropfmühl) are homogeneously suspended in 15.0 kg of styrene with addition of 1.5 kg of polystyrene, 200 g of hexabromocyclododecane, 70.0 g of dicumyl peroxide a nd 12.0 g of tert-butyl peroxy-2-ethylhexanoate. The organic phase is introduced into 20.0 l of deionized water in a 50 l stirred vessel. The aqueous phase comprises 50.0 g of sodium pyrophosphate and 100.0 g of magnesium sulfate (Epsom salts). The suspension is heated to 80° C. After 140 minutes, 2.5 g of pentane are metered in and polymerization is completed at 125° C. for 5 hours. This gives beads having an internal water content of 2.7% and a residual styrene content of 960 ppm.

b) Example using di-tert-amyl peroxide (according to the present invention)

The procedure in a) is repeated using di-tert-amyl peroxide in place of dicumyl peroxide. This gives beads having an internal water content of 1.4% and a residual styrene content of 420 ppm.

We claim:

1. A process for producing expandable styrene polymers (EPS) in which styrene, optionally together with up to 20% of its weight of comonomers, is polymerized in aqueous suspension in the presence of at least two organic peroxides A and B which decompose at different temperatures, where the peroxide A has a half-life period of 1 hour at from 80° C. to 100° C. and the peroxide B has a half-life period of 1 hour at from 110° C. to 150° C., wherein the peroxide B which decomposes at the higher temperature is di-tert-amyl peroxide.

2. A process for producing EPS as claimed in claim 1, wherein from 0.01 to 0.20 mol % of peroxide A and from 0.10 to 1.0 mol % of peroxide B, based on the monomer, are used.

3. A process for producing EPS as claimed in claim 1, wherein the polymerization is carried out in the presence of from 0.01 to 25% by weight of graphite particles, based on the monomers.

* * * * *